UNITED STATES PATENT OFFICE.

ALBERT G. MANNS, OF CHICAGO, ILLINOIS, ASSIGNOR, BY DIRECT AND MESNE ASSIGNMENTS, TO FOOD & FIBER PRODUCTS COMPANY, OF CHICAGO, ILLINOIS, A CORPORATION OF ILLINOIS.

ANIMAL FOOD.

No. 839,305.  Specification of Letters Patent.  Patented Dec. 25, 1906.

Application filed April 14, 1905. Serial No. 255,543.

*To all whom it may concern:*

Be it known that I, ALBERT G. MANNS, a citizen of the United States, residing at Chicago, in the county of Cook and State of Illinois, have invented certain new and useful Improvements in Animal Food, of which the following is a specification.

This invention relates to an improved animal food, and refers more particularly to foods of that character in which extracts of vegetable and animal matters are mixed with forage to produce a product which is at once palatable, of comparatively concentrated form, and of relatively high food value.

The salient objects of the invention are to produce a food of which an extract derived as a by-product in the treatment of field-cured or dry cornstalks may be utilized as one of the chief ingredients of the food: to provide a food which is of high food value, especially in its fattening qualities; to provide a product which does not readily spoil or deteriorate under ordinary weather conditions and which may therefore be cheaply packaged and handled; to provide a product which may be put up in either dry or semifluid form, and in general to provide an improved product of the character referred to.

I have discovered that by subjecting cornstalks or analogous plants to a comparatively drastic extracting treatment in a bath of hot water or steam for a sufficient time the water-soluble constituents, and particularly the sugars, proteids, and phosphates, are set free, and when thereafter concentrated the extract thus derived has peculiar characteristics, is of high nutritive value, and particularly suitable to form one of the chief ingredients of a compound animal food hereinafter described. Such extract is found upon analysis to contain a large percentage of fermentable saccharine matter, a very considerable percentage of proteids, and a large percentage of mineral matters, including phosphates. For example, an analysis of such extract derived from ordinary field-cured and dried maize or Indian-corn stalks cut after the plant was substantially mature and extracted as above described shows the following constituents: fermentable saccharine matter, 48.21 per cent.; ash or mineral matter, 15.15 per cent.; insoluble matter, 2.76 per cent.; pentosans, trace; proteids, 1.63 per cent.; moisture, 32.25 per cent.

The food value of blood is well understood, but it is difficult to so combine the same with other substances that animals, especially neat cattle, will readily eat it, although this has been done. I have found that blood may be combined with the extract from cornstalks or analogous plants and with a suitable dry forage to form a compound at once palatable and of relatively high food value. In making this compound I preferably employ about twenty-five per cent., by weight, of the extract (concentrated to about thirty-two per cent. moisture) and seventy-five per cent. of animal blood and mix with this mixture sufficient forage to absorb the same and bring it to a friable and approximately dry condition. The absorbent material may be any of the usual forage foods, such as bran, chaff, or other dry forage of this general character. The mass may be mixed with the forage in any convenient or desired manner and formed into cakes by pressure, or the mass may be rendered substantially dry, so that it loses its cohesive character. Its keeping qualities are improved by drying it to a condition where it contains no more moisture than would be absorbed from atmospheric air under normal conditions, although it keeps well under ordinary conditions when not dried to this extent.

From the foregoing description it will be obvious that the proportions and ingredients may be somewhat modified without departing from the invention, and accordingly I do not limit myself to the precise details specified.

I claim as my invention—

The herein-described food compound consisting of a concentrated water extract of cornstalks, soluble in water and containing a relatively high per cent. of protein, phosphates and uncrystallizable sugar, and a low per cent. of crystallizable polyoses, animal blood, and an absorbent and nutritious forage, thoroughly intermingled and substantially dry, substantially as described.

ALBERT G. MANNS.

Witnesses:
H. E. OTTE,
J. H. ERICSON.